Sept. 16, 1930.  V. BENDIX  1,775,804
BRAKE FOR SWIVELED WHEELS
Original Filed June 13, 1925   2 Sheets-Sheet 1
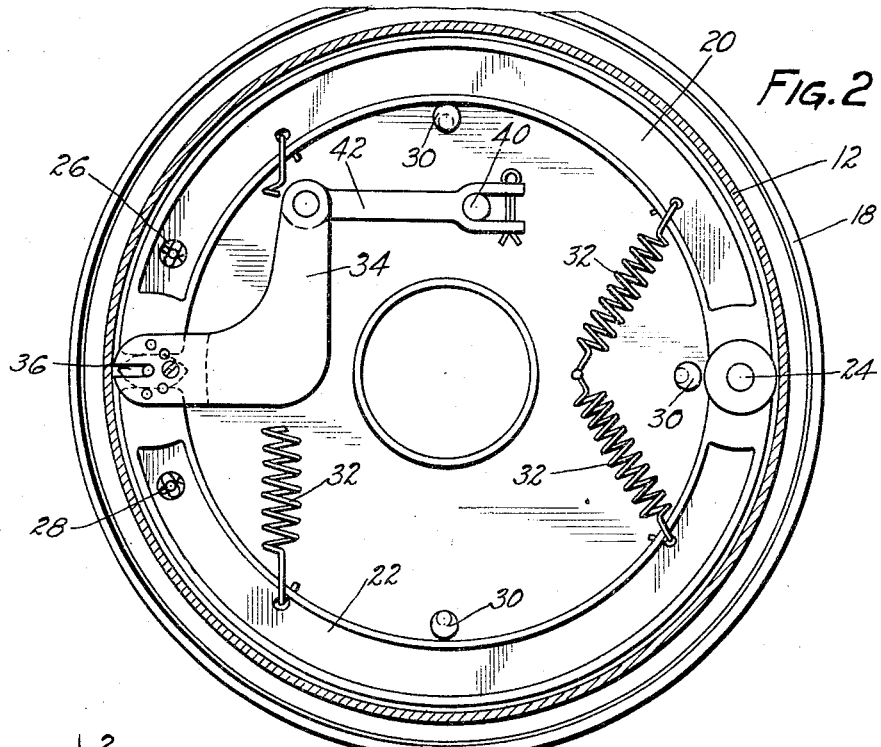
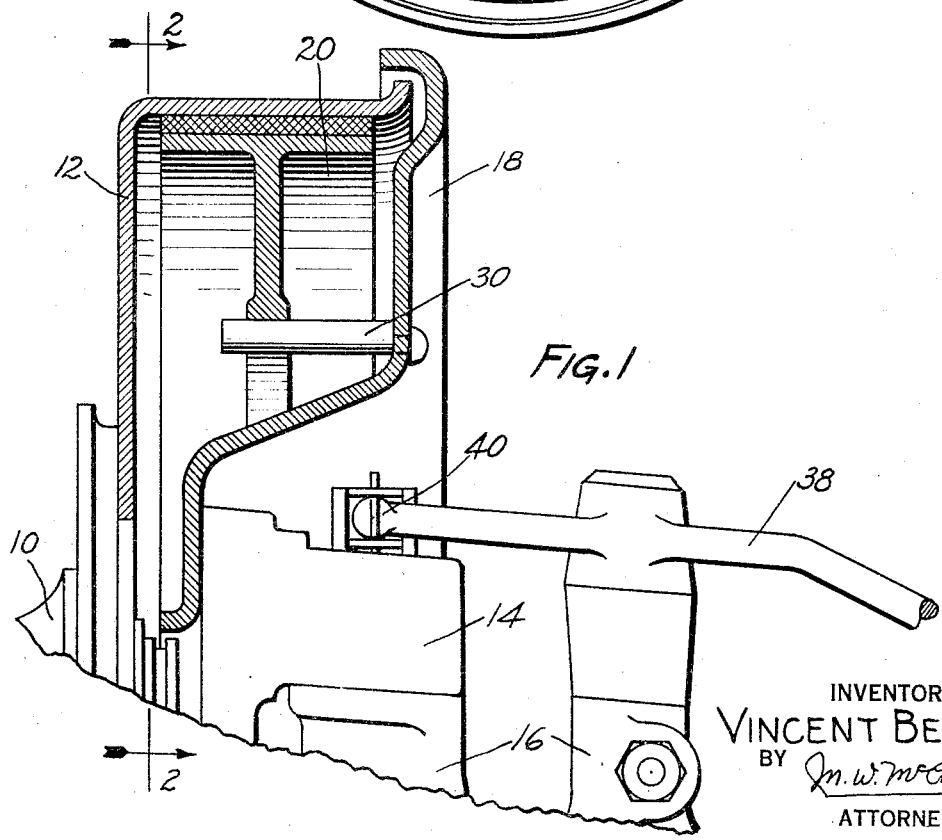
INVENTOR
VINCENT BENDIX
BY M. W. McConkey
ATTORNEY

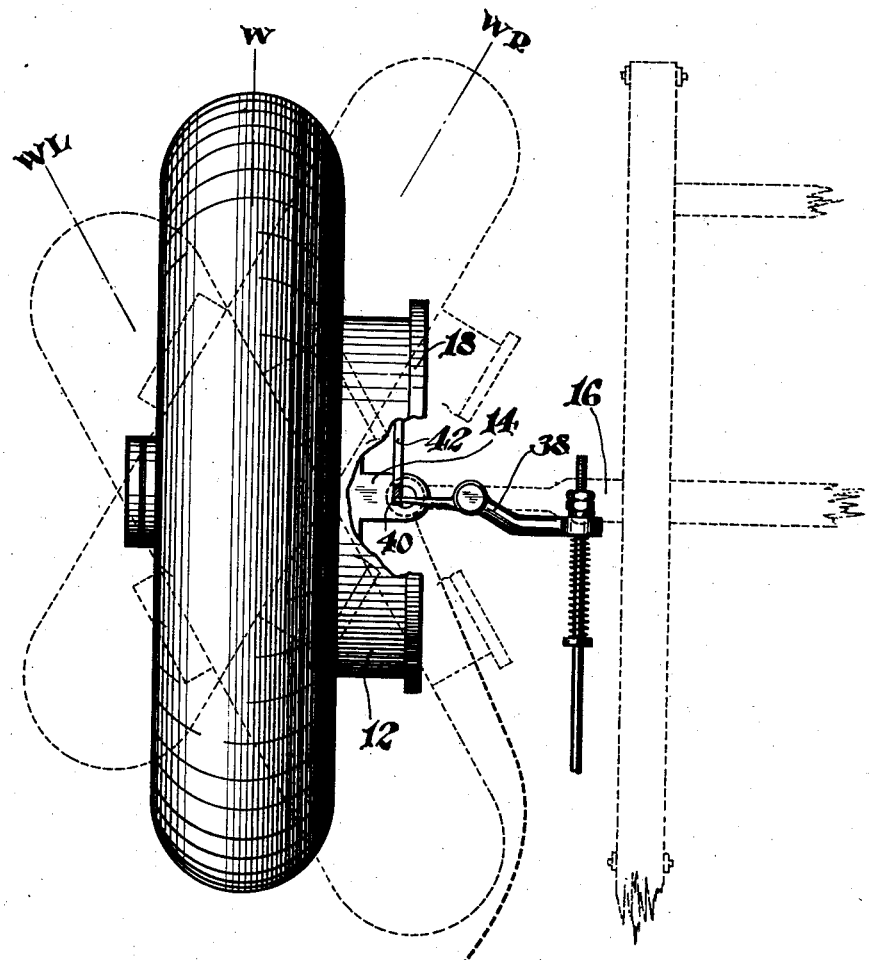
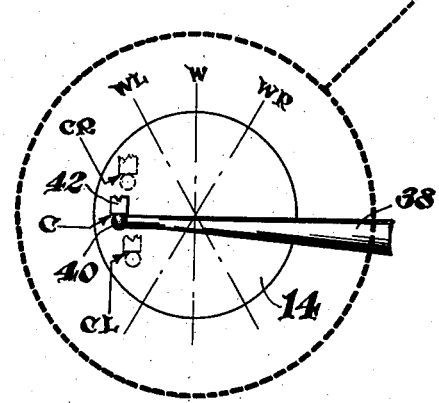
Fig. 3

Patented Sept. 16, 1930

1,775,804

UNITED STATES PATENT OFFICE

VINCENT BENDIX, OF CHICAGO, ILLINOIS, ASSIGNOR TO BENDIX BRAKE COMPANY, OF CHICAGO, ILLINOIS, A CORPORATION OF ILLINOIS

BRAKE FOR SWIVELED WHEELS

Application filed June 13, 1925, Serial No. 36,785. Renewed June 4, 1928.

This invention relates to brakes and is illustrated as embodied in brake mechanism for a swiveled automobile wheel. An important object of the invention is to provide a control which will not interfere with the swiveling of the wheel and which will permit the use of a brake of the "double wrapping" or "duo servo" type, in which the retarding member has a slight circumferential shifting so that it can anchor at either end according to the direction of rotation of the drum. Heretofore this shifting has thrown the brake control out of position with respect to the swiveling axis of the wheel so that it has not been possible with most previous brake controls to use this type of brakes for swiveled wheels.

In one desirable arrangement the connection from the non-swiveling part of the control to the part which swivels with the wheel is arranged to have a slight movement permitting the circumferential shifting as described and which is substantially at right angles to the brake-applying movement so that it does not substantially change its position with respect to the swiveling axis. In the illustrated embodiment, this connection is a substantially horizontal link from the brake-applying lever which can pivot about the end of the lever to permit the shifting of the brake.

Other objects and features of the invention, including a novel arrangement permitting the varying of the pressure on the brake by swiveling the wheel, and other novel combinations of parts and desirable particular constructions, will be apparent from the following description of one illustrative embodiment shown in the accompanying drawings, in which:
Figure 1 is a vertical section through the upper part of a brake of the type described arranged on a swiveled wheel;

Figure 2 is a vertical section on the line 2—2 of Figure 1 just inside the wheel and showing the brake shoes in side elevation;

Figure 3 is a diagrammatic top plan view illustrating the relieving of the pressure on the outer brake when the wheels are swiveled.

In the particular arrangement selected for illustration, the invention is embodied in an automobile chassis including a road wheel having a hub 10 carrying a brake drum 12 and rotatably mounted on a knuckle 14 swiveled by means of the usual king pin at one end of the axle 16. The knuckle 14 is shown as carrying the usual backing plate or other stationary support 18.

The "duo servo" brake illustrated includes shoes 20 and 22 pivotally connected at 24 and arranged to anchor either on a pin 26 or on a pin 28 according to the direction of rotation of the drum, the pins 26 and 28 being carried by backing plate 18 and passing through suitable slots in the webs of the shoes 20 and 22 near their free ends. The idle positions of the shoes is shown as determined by adjustable eccentric stops 30 against which the shoes are held by springs 32. Except as further described below, the above-identified parts may be of any particular construction.

The brake is shown as applied by a novel floating bell crank lever 34 having a forked end in which is adjustably mounted a double cam 36 part operatively engaging the ends of the shoes 20 and 22. The cam has at its ends pintles pivoted in the fork, and is held in place by a setscrew passing through one of a series of holes in one arm of the fork. The non-swiveling part of the control is shown as a generally horizontal lever 38 pivoted on the axle and having a part such as ball end 40 movable substantially perpendicularly to the swiveling axis to an active position substantially in that axis, i. e., with its center not more than ½ inch or so from that axis. The part 40 of the lever 38 and the upper end of the bell crank lever 34 are connected by means such as a substantially horizontal link 42 pivotally connected to the two levers at its opposite ends. Lever 34, including its cam part, is supported and held in position entirely by the shoes 20 and 22. It will be seen that the slight circumferential shifting of the cam 36 according to whether the friction device including shoes 20 and 22 anchors at 26 or at 28 is taken care of by a slight movement of the link 42 in an up-and-down direction,— that is, in a direction substantially at right angles to the directional movement in applying the brake. As the cam 36 is approximately in the horizontal diameter of the drum and is arranged at the front side of the drum, this permits the compensating movement of link 42 to be approximately vertical while its brake-applying movement, due to the operation of the lever 38, is approximately horizontal.

Figure 3 illustrates the arrangement when it is desired to relieve the pressure on the outer brake on a turn. In this diagram we are considering that in Figure 1 we are looking forward at the left front wheel. Figure 3 represents a top plan view of the left front wheel, with the front of the vehicle at the top of the diagram. The swiveling axis is at the center of the circle, and lines W, WR, and WL are respectively parallel to the wheel when straight ahead, swiveled right, and swiveled left. When the wheel is parallel to W, the joint between 40 and 42 is at C; when the wheel is parallel to WR the joint tends to move to CR, and when the wheel is parallel to WL the joint tends to move to CL. It will be seen that this relieves the pressure on the brake when on the outside of a turn.

The novel brake-applying means including forked lever 34 and the adjustable cam 36 is not claimed specifically in the present application, as it forms the subject-matter of my co-pending application No. 34,147, filed June 1, 1925, Patent No. 1,656,263, granted January 17, 1928.

While one illustrative embodiment of the invention has been described in detail, it is not my intention to limit its scope to that particular embodiment or otherwise than by the terms of the appended claims.

I claim:

1. A vehicle having, in combination, a swiveled wheel having a drum, a friction device engageable with the drum and having a slight circumferential movement when the brake is applied, means for applying the friction device to the drum, an operating device having a part arranged when the brake is applied adjacent the swiveling axis, and a connection between said part and the brake-applying means arranged to swing about said part during said circumferential shifting and movable lengthwise in applying the brake.

2. A brake comprising, in combination, a swiveled wheel having a drum, an expansible friction device within the drum arranged to anchor at either end according to the direction of rotation of the drum, a member arranged to expand the friction device against the drum and having a slight circumferential shifting according to the end at which said device anchors, non-swiveling means arranged to operate the brake and having a part adjacent the swiveling axis when the brake is applied, and a link connecting said part and said member arranged for movement during said circumferential shifting in a direction substantially at right angles to its movement in applying the brake.

3. A vehicle having, in combination, a swiveled wheel having a drum, an expansible friction device within the drum arranged to anchor at either end according to the direction of rotation of the drum, a member movable to expand said friction device and having a slight circumferential movement according to the end at which the friction device anchors, a horizontally movable lever having a part adjacent the swiveling axis when the brake is applied, and a generally horizontal part connecting said part of the lever and the brake-applying member and arranged to pivot about its point of engagement with the lever during said circumferential movement.

4. A vehicle having, in combination, a swiveled wheel having a drum, an expansible friction device within the drum arranged to anchor at either end according to the direction of rotation of the drum, a lever arranged to expand the friction device against the inside of the drum, a generally horizontal lever having a part movable toward the swiveling axis to active position, and a substantially horizontal link connecting the two levers.

5. A vehicle having, in combination, a swiveled wheel having a drum, an expansible friction device within the drum, an expanding device therefor arranged approximately in the horizontal diameter of the drum at the front side of the drum, a bell crank lever for operating the expanding device having a part extending toward the top of the drum, an operating lever having a part arranged for generally horizontal movement to active position, and a link connecting said part of the operating lever to the upwardly extending part of the bell crank lever.

6. A vehicle having, in combination, a swiveled wheel, retarding means therefor, operating means swiveling with the wheel and arranged to operate the retarding means, a lever having a part movable generally perpendicular to the swiveling axis to its active position, and a link pivotally connected to said part of the lever and connecting the lever to the operating means, the joint between the lever and link being so arranged with respect to the swiveling axis as to vary the pressure on the retarding means when the wheel is swiveled.

7. A vehicle having, in combination, a swiveled wheel, retarding means therefor, operating means swiveling with the wheel and arranged to operate the retarding means, a lever having a part movable generally perpendicular to the swiveling axis to its active position, and a link pivotally connected to said part of the lever and connecting the lever to the operating means, the joint between the lever and link being arranged between the swiveling axis and the wheel.

8. A brake comprising, in combination, a drum, friction means within the drum having separable ends, applying means for forcing the separable ends apart including a vertically-extending lever, a horizontal lever extending in a direction generally perpendicular to the plane of the brake, and a lengthwise-movable connection from the horizontal lever to the vertically-extending lever.

9. A brake comprising, in combination, a drum, friction means within the drum having ends which are separable to expand the friction means to apply the brake, a vertically-extending lever comprising a cam portion for operating the friction means, a horizontal lever extending in a direction generally perpendicular to the plane of the brake, and a lengthwise-movable connection from the horizontal lever to the vertically-extending lever.

10. A brake comprising, in combination, friction means, a shiftable applying device for said means having the major portion thereof extending substantially parallel to the direction of shifting and which device shifts with said friction means, a lengthwise-movable member connected to said device and moving substantially at right angles to the direction of shifting, so that the brake-applying force transmitted therethrough has substantially no tendency to shift said applying device and a horizontal operating lever generally perpendicular to the plane of the brake connected to the lengthwise-movable member.

11. A brake comprising, in combination, friction means, a vertically floating applying device including a vertically-extending part, a horizontal operating lever generally perpendicular to the plane of the brake, and a horizontal and lengthwise movable connection between the two levers.

12. A brake comprising, in combination, friction means, a vertically floating applying device including a vertically-extending lever, an operating member moving in a plane substantially perpendicular to the plane of the brake, and a horizontal and lengthwise movable connection between the lever and said member.

13. A brake comprising, in combination, a drum, friction means within the drum having separable ends at one side thereof, a floating operating lever engaging and wholly supported by said ends, together with operating means for said lever directly connected thereto.

14. A brake comprising, in combination, a drum, friction means within the drum having separable ends at one side thereof, a floating operating lever, including a cam portion, engaging and wholly supported by said ends, together with operating means for said lever directly connected thereto.

15. A brake comprising, in combination, a drum, friction means within the drum having separable ends, a floating angle shaped lever within the drum having at one end expanding means extending between and supported by said ends and having at its other end operating connections extending exteriorly of the drum.

16. A brake comprising, in combination, a drum, friction means within the drum having separable ends, a floating angle shaped lever, one end of which is provided with spaced-apart portions supporting thrust and fulcrum portions, which portions extend between and are supported by said spaced-apart ends.

17. A brake comprising, in combination, a drum, friction means within the drum having separable ends, a floating lever member within the drum wholly supported by the spaced-apart ends of the friction means, said lever characterized by having at one end thereof spaced-apart portions, which portions serve as supports for spaced-apart thrust and fulcrum portions, together with means extending within the drum and connected to the other end of the lever to operate the same.

18. A brake comprising, in combination, a drum, friction means within the drum having separable ends and arranged to have one part anchor when the drum is turning in one direction and to have a different part anchor when the drum is turning in the other direction, a floating lever wholly supported by said friction means, said lever having an applying portion acting on said ends and having an end adjacent the inside of the top of the drum, together with operating connections from said end extending exteriorly of the drum.

In testimony whereof I have hereunto signed my name.

VINCENT BENDIX.